(No Model.) 2 Sheets—Sheet 1.
C. H. MATTICE.
SCALE.
No. 599,529. Patented Feb. 22, 1898.
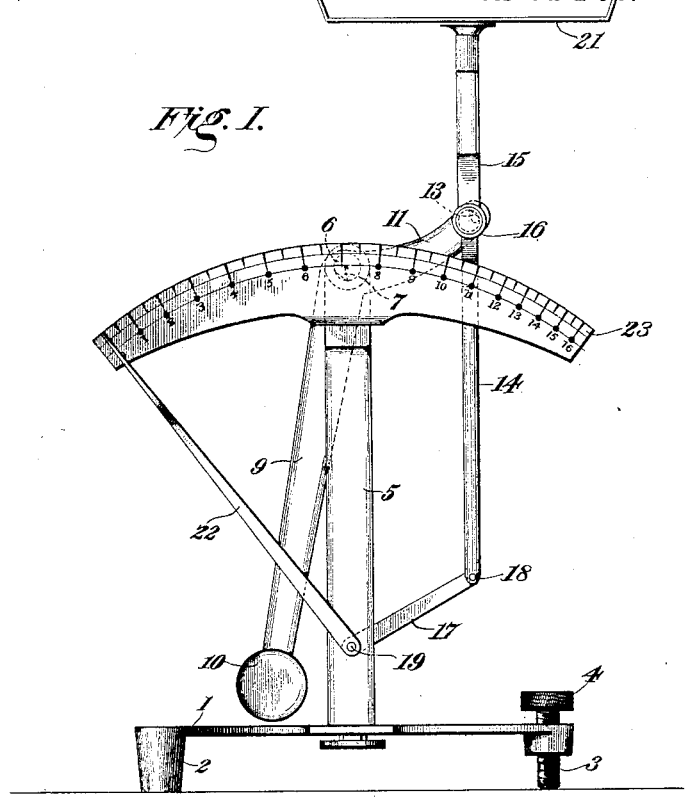
Fig. I.
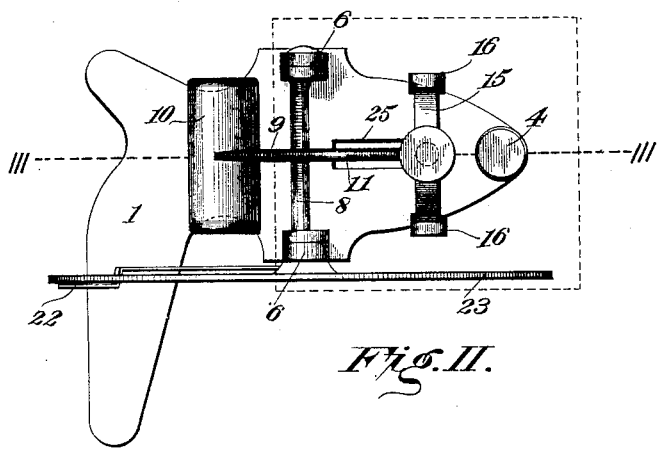
Fig. II.
Witnesses
M. E. Fowler
S. M. Acker
Inventor
Charles H. Mattice,
By Joseph L. Atkins
Attorney

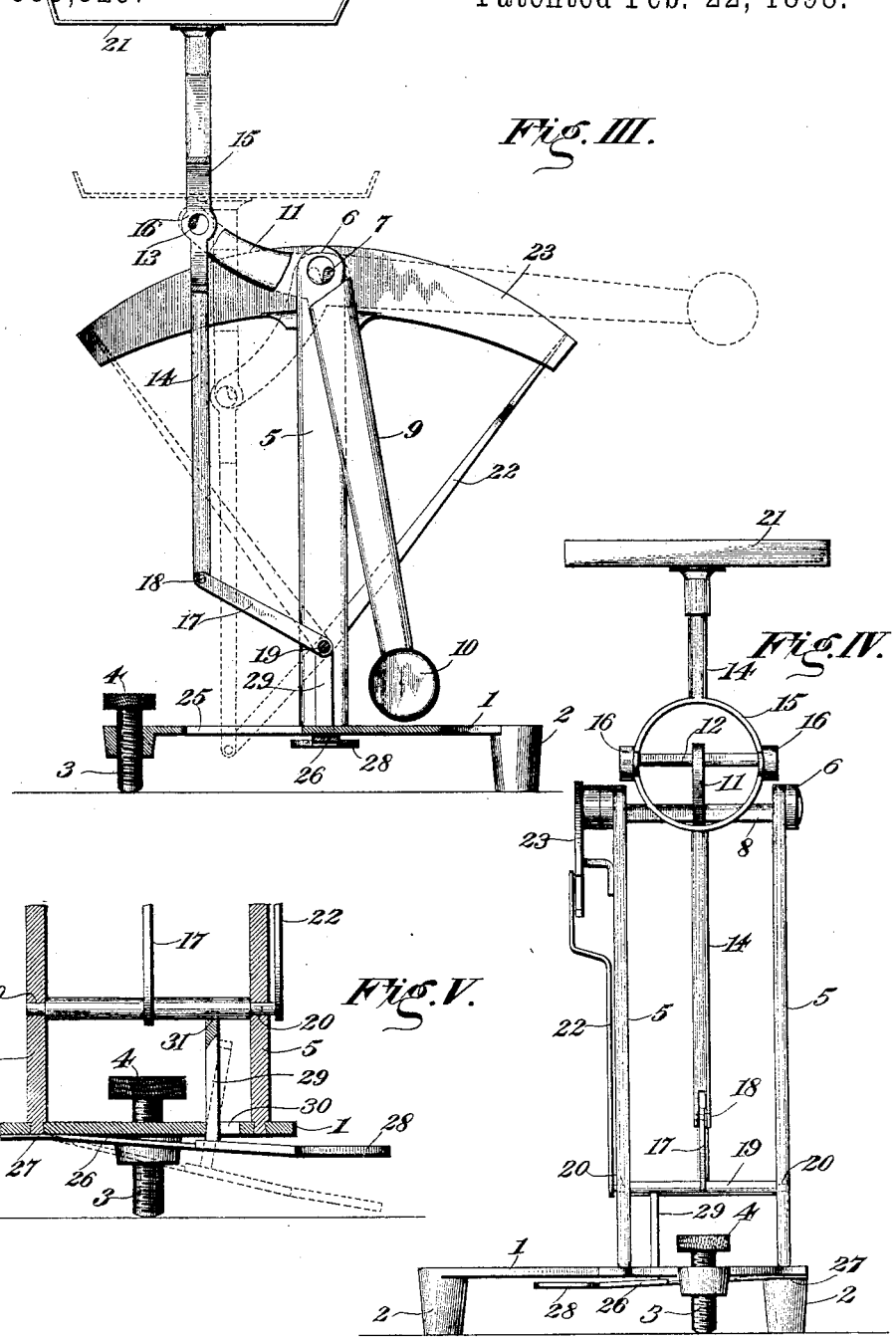

UNITED STATES PATENT OFFICE.

CHARLES H. MATTICE, OF TROY, NEW YORK, ASSIGNOR TO THE MICROMETER BALANCE SCALE COMPANY, OF SAME PLACE.

SCALE.

SPECIFICATION forming part of Letters Patent No. 599,529, dated February 22, 1898.

Application filed December 15, 1896. Serial No. 615,772. (No model.)

*To all whom it may concern:*

Be it known that I, CHARLES H. MATTICE, of Troy, in the county of Rensselaer, State of New York, have invented certain new and useful Improvements in Scales, of which the following is a complete specification, reference being had to the accompanying drawings.

The object of my invention is to produce an improved automatic weighing device in which symmetry and neatness of form, combined with accuracy of measurement, are objects specially aimed at.

In my device all springs are dispensed with and a swinging weight is operatively connected with a pointer or indicator which sweeps across the face of a graduated segment supported above the middle portion of the scale-frame.

In the accompanying drawings, Figure I is a side elevation of my scale at rest. Fig. II is a top plan view of the same with the pan removed. Fig. III is a section on the line III III of Fig. II, looking toward the direction in which the arrows point, with portion of the weight-arm broken away. In this figure the scale is shown at rest in full lines and at the limit of its movement in dotted lines. Fig. IV is a side view of the subject-matter of Fig. I, looking toward the pan-supporting frame. Fig. V is a detail of a portion of the mechanism, illustrative of the brake.

Referring to the figures on the drawings, 1 indicates a tripodic base, two of whose feet 2 are fixed or made integral with it and whose third foot 3 consists of a leveling-screw working in a suitable aperture in the base. The screw 3 is provided with a knurled head 4, by which it may be turned for adjusting the level of the base. Midway upon the base I provide two rigid and perpendicular standards 5, whose upper ends are provided with oppositely-opening cylindrical boxes 6, within which work the knife-edged trunnions 7 of an oscillatory cross-bar 8. The cross-bar carries a bent scale-beam, whose long arm 9 terminates in a fixed weight 10 and whose short arm 11 carries a fixed cross-piece 12. The cross-piece 12 terminates at its opposite extremity in knife-edges 13, which are designed to sustain a pan-supporting frame. The pan-supporting frame preferably consists of a broken rod 14, united by an annulus 15, that carries diametrically opposite cylindrical boxes 16, which receive the knife-edges of the cross-piece 12. The rod 14 is held movably in the perpendicular position by means of a link 17, pivoted at one end, as indicated at 18, to the rod and at the other end to a rock-shaft 19, mounted in suitable bearings 20 in the standards 5 near their lower ends. The rod 14 carries upon its upper end a pan or platform 21, which is adapted to receive a weight to be measured. The weight to be measured tends to depress the rod 14 proportionately to its relative gravity and that of the weight 10. The link 17 and the short arm 11 of the bent scale-beam being parallel and the rock-shaft 19 and the cross-piece 8 being united by them, the downward movement of the rod 14 is directly proportionate to the rotatory movement of the rock-shaft 19.

A pointer or indicator is adapted by its movement to indicate upon a graduated scale the proportional gravity of the article to be measured and that of the weight 10.

I provide upon one of the standards 5, next to the end of the rock-shaft 19 which carries the indicator 22, a graduated segment 23, which is supported by its standard directly above the middle portion of the base and which is graduated in terms of any scale measure which may be adopted. As illustrated, it is graduated in units of one ounce.

By reference particularly to Fig. III of the drawings it will be observed that the leverage obtained through the sweep of the long arm 9 of the bent scale-beam increases as that arm rises, and that the pan end of the lever travels also in a circular course as the scale is loaded, increasing and decreasing its leverage as it crosses the center of gravity. The segment 23 is graduated accordingly, the distance between the respective graduations being greatest when the weight 10 is near the vertical position and least as it approaches the horizontal.

Scales of this class being designed to accurately weigh comparatively light articles, it is necessary to provide practicable means for causing the indicator to show exceedingly small variations in weight. For this reason I provide the knife-edges 7 and 13 (see Fig.

III) and have located them so as to cause them to perform their functions throughout the entire movement of the scale-beam. To accomplish this, the knife-edges 7 are adjusted so as to lie flat against one side of their respective boxes 6 when the scale is at rest and to turn as a hinge upon their edges from one side of the boxes to the other during the movement of the scale-beam. This movement of the knife-edges is clearly discernible in Fig. III, in which one of their positions is shown in full lines and the other in dotted lines. The knife-edges 13 are similarly located with respect to their boxes 16, lying in one position against one side of their respective boxes and in the other position against the opposite side thereof.

To accommodate the extreme downward movement of the rod 14, I provide an aperture 25 in the base 1.

In order to quickly subdue the vibration of the scale-beam after a weight is placed in the pan, I prefer to provide upon the bottom of the base a resilient plate 26, secured, as indicated at 27, to the bottom of the base and projecting at the other end beyond the base to form a thumb-piece 28. The plate 26 carries a brake-piece 29, which, working through an aperture 30 in the base, normally makes contact against the periphery of the rock-shaft 19, being preferably provided with a curved end 31, which fits around the rock-shaft. Through the resiliency of the plate 26 the brake-piece 29 is forced against the rock-shaft 19, tending by friction to retard its movement. When by aid of the thumb-plate 28 the plate 26 is depressed, the rock-shaft 19 is relieved from engagement with the brake-piece 29 and free movement of the rock-shaft is permitted.

After an article to be weighed has been placed in the pan 21 and the scale-beam has swung out under its impulse the operator releases the thumb-piece 28 and the brake-piece 29 quickly brings the weighing mechanism to rest.

In operating my scale the base should always be leveled by aid of the screw 3 until the indicator 22 points to zero upon the graduated segment 23. Having been properly adjusted to that point, the scale can be depended upon to accurately register differences of weight in terms of the scale inscribed upon the segment.

What I claim is—

In a scale, the combination with a frame, standards, and oscillatory weighing mechanism carried upon the standards, of a rock-shaft incorporated with the weighing mechanism, a resilient plate secured at one end to the base, and projecting beyond the base at the other end, a brake-piece secured to the plate, and normally engaging with the rock-shaft, said brake-piece working through an aperture in the piece, substantially in the manner and for the purpose specified.

In testimony of all which I have hereunto subscribed my name.

CHARLES H. MATTICE.

Witnesses:
E. OGDEN ROSS,
CORNELIUS FOGARTY.